Feb. 17, 1948.     G. BOGGIO     2,436,033
POWER TRANSMISSION MECHANISM
Filed Dec. 6, 1945     2 Sheets-Sheet 1
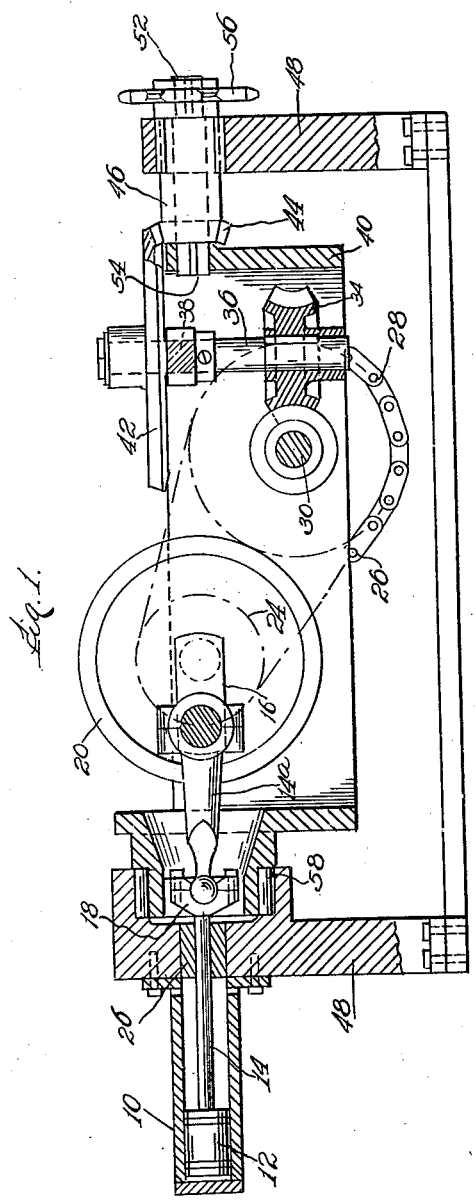
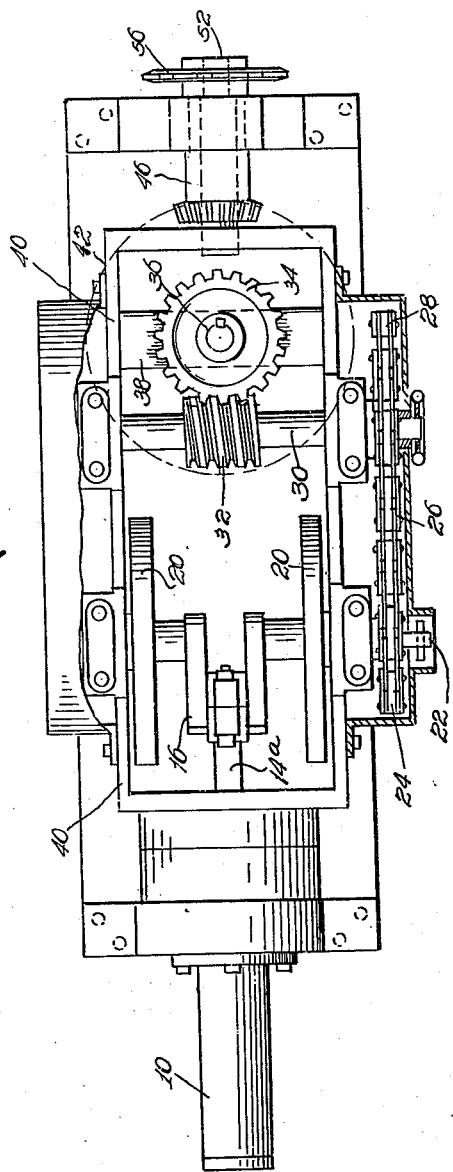
Inventor:
Giusto Boggio
by Albert Fihe
Attorney.

Feb. 17, 1948.     G. BOGGIO     2,436,033
POWER TRANSMISSION MECHANISM
Filed Dec. 6, 1945     2 Sheets-Sheet 2
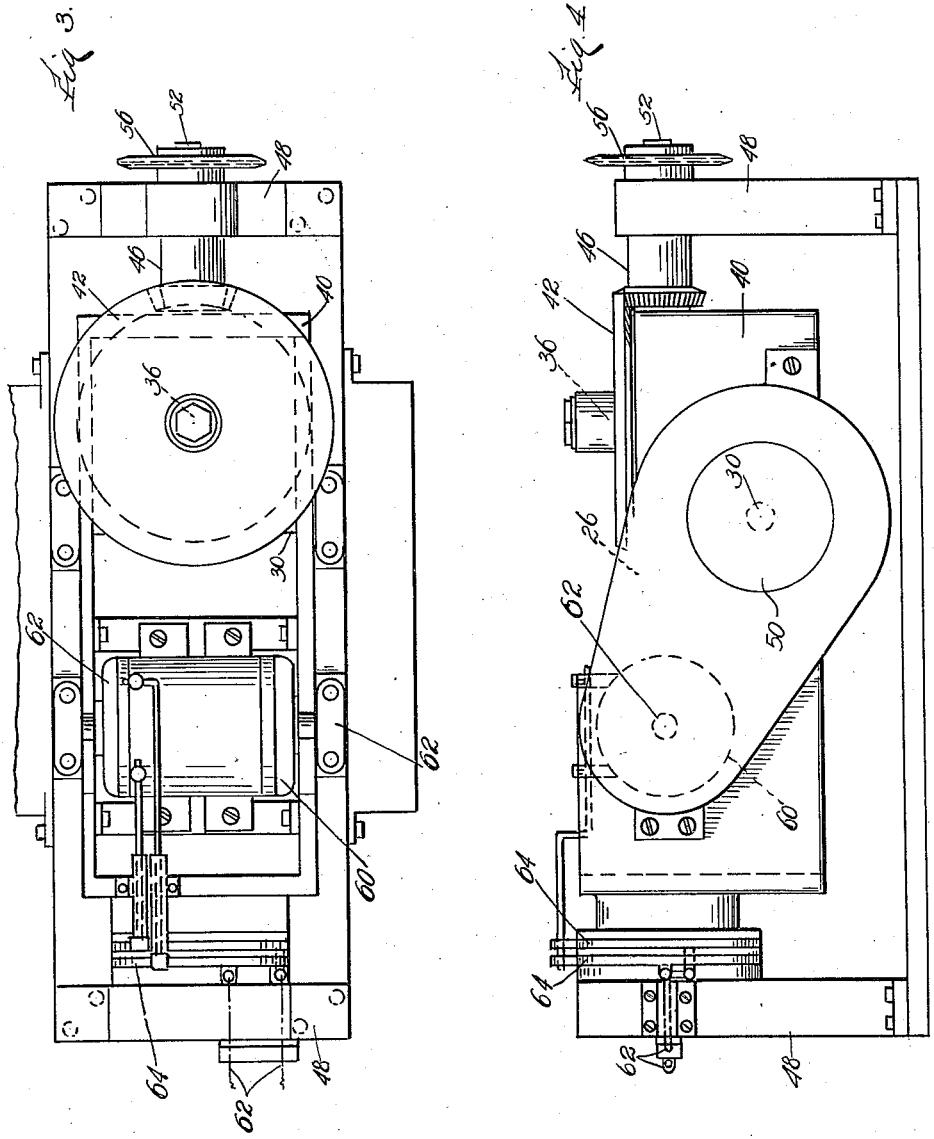
Inventor:
Giusto Boggio.
by Albert J. Fike
Attorney.

Patented Feb. 17, 1948

2,436,033

UNITED STATES PATENT OFFICE 2,436,033

POWER TRANSMISSION MECHANISM

Giusto Boggio, Chicago, Ill.

Application December 6, 1945, Serial No. 633,079½

8 Claims. (Cl. 74—44)

1

This invention relates to an improved power transmission mechanism and has for one of its principal objects the provision of means whereby reciprocatory motion may be efficiently and economically converted into rotary motion or vice versa.

One of the important objects of this invention is to provide a mechanism for power transmission which shall be simple of construction, readily operated, not likely to get out of order and which can be used in almost any position where power transmission is employed.

A still further important object of the invention resides in the provision of a means for transmitting power which can be made of various sizes arranging from a very small unit to one of enormous size and without departing from the general principles and methods of operation set forth.

Another and still important object of the invention resides in the provision of a power mechanism which may have a self-contained source of power whereby this power may be transmitted in either increased or reduced speeds to meet various requirements.

Other and further important objects of the invention will be apparent from the disclosures in the accompanying drawings and following specification.

The invention, in a preferred form, is illustrated in the drawings and hereinafter more fully described.

In the drawings:

Figure 1 is a side elevation of the improved power transmission mechanism of this invention showing the same in some detail with certain parts omitted.

Figure 2 is a top plan view of the mechanism illustrated in Figure 1, certain other parts being omitted for purposes of clarity.

Figure 3 is a top plan view of the power transmission mechanism of this invention showing a slightly modified form of the invention.

Figure 4 is a side elevation of the structure illustrated in Figure 3.

As shown in the drawings:

The reference numeral 10, indicates generally some source of power such as a reciprocating internal combustion engine. The details of which are not important so far as the present application is concerned.

The piston 12 of such an engine 10 is attached by means of a connecting rod, or the like, 14, to the offset portion of a crank shaft 16 in the usual manner. There is a ball and socket joint

2 connection 18 incorporated into the connecting rod 14 so that a desirable and necessary rotation of the inner end 14a of the connecting rod is permitted.

Mounted on the crank shaft 16 is a pair of fly wheels 20 which insures an easily and uniform movement of rotation of the crank shaft and obviously the movement of fly wheels may be reduced or increased as desired.

One end of the crank shaft 16 extends outwardly beyond the house of the apparatus as shown at 22 in Figure 2 and an ordinary starting crank may be applied to this end 22 to initiate movement of the crank shaft, fly wheels and motor.

The crank shaft 16 also has fitted thereonto one or two sprockets 24, there being preferably two of these sprockets, one at each end of the crank shaft, although for purposes of clarity, only one is illustrated.

These sprockets 24 are connected by means of chains 26 to larger sprockets 28 as shown in Figures 1 and 2 whereby a decreased speed of rotation is imparted to a shaft 30 upon the ends of which the sprockets 28 are mounted.

Affixed centrally of the shaft 30 is a worm 32 which in turn meshes with a worm gear 34, this worm gear being mounted on a shaft 36 which is affixed to a cross bar 38 mounted in the frame 40 of the machine.

The shaft 36 extends upwardly as best shown in Figure 1 and upon its outer end is mounted a bevel gear 42 which in turn meshes with a smaller bevel gear 44.

This bevel gear 44 is of any desired size relationship to the bevel gear 42 except that it is smaller and is, in turn mounted on a sleeve 46, which sleeve is fixed in an upright position 48, forming part of the frame of the machine. This fixing of the sleeve is preferably accomplished by means of a key 50.

Fitted into the sleeve 46 is a shaft 52, the inner end of which is keyed at 54 to the inner frame work 40 of the mechanism and the outer end of this shaft 52 is provided with the power take off sprocket, or the like, 56.

For ease in starting the mechanism by means of a crank attached to the end 22 of a crank shaft 16, a clutch as best shown in Figure 4 is provided at the end of the shaft 30 whereby starting may be accomplished manually without the necessity of moving the entire mechanism and its attached device thereby driven.

This clutch comprises simply an outer casing 50 mounted on the end of the shaft 30 and when this clutch is in driving position it engages the shaft 30 with the driven sprocket 28.

In Figures 3 and 4 a built in electric motor 60 is illustrated as the prime mover. The current is carried to the motor by means of wires 62 operating through ring conductors 64 in the usual manner. The shaft 62 of the motor is driven when current is applied and this in turn communicates rotary motion to the sprockets 24, chains 26 and the remainder of the mechanism hereintobefore described.

It will be evident that herein is provided a power transmission means which will convert reciprocating to rotary motion in an efficient manner and with varying speed ratios as desired. Such varying speed ratios may be accomplished by changes in the relative sizes of the sprockets 24 and 28 or of the worm and wheel 32 and 34 respectively or of the bevel gears 42 and 44. Obviously the entire frame 40 rotates when the mechanism is in operation this being accomplished by reason of the fact that the bevel gear 44 is fixed with relationship to the main frame 48 and suitable bearings 58 are provided to support the rotating frame 40 and its component parts.

I am aware that many changes may be made and numerous details of construction varied throughout a wide range without departing from the spirit of the invention, and I, therefore, do not purpose limiting the patent granted hereon otherwise than as necessitated by the prior art.

I claim as my invention:

1. A power transmission mechanism including a source of power, a rotatable shaft, a sprocket on said shaft, a second shaft removed from the first shaft, a common supporting means for both shafts, a sprocket on the second shaft, a chain connecting the two sprockets, a worm wheel on the second shaft, a worm gear driven by the worm wheel, a shaft upon which the worm gear is mounted and which is driven thereby, a bevel gear surmounting said shaft, a smaller bevel gear in mesh with said first named bevel gear, said smaller bevel gear being fixedly positioned with relation to the aforesaid mechanism.

2. A power transmission mechanism including a source of power, a rotatable shaft, a sprocket on said shaft, a second shaft removed from the first shaft, a common supporting means for both shafts, a sprocket on the second shaft, a chain connecting the two sprockets, a worm wheel on the second shaft, a worm gear driven by the worm wheel, a shaft upon which the worm gear is mounted and which is driven thereby, a bevel gear surmounting said shaft, a smaller bevel gear in mesh with said first named bevel gear, said smaller bevel gear being fixedly positioned with relation to the aforesaid mechanism, said fixed mounting including a sleeve, a shaft passing through said sleeve, means fastening the frame supporting the mechanism to the inner end of said shaft and a power take off means on the outer end of said shaft.

3. A power transmission mechanism including a source of power, a rotatable shaft, a sprocket on said shaft, a second shaft removed from the first shaft, a common supporting means for both shafts, a sprocket on the second shaft, a chain connecting the two sprockets, a worm wheel on the second shaft, a worm gear driven by the worm wheel, a shaft upon which the worm gear is mounted and which is driven thereby, a bevel gear surmounting said shaft, a smaller bevel gear in mesh with said first named bevel gear, said smaller bevel gear being fixedly positioned with relation to the aforesaid mechanism, said fixed mounting including a sleeve, a shaft passing through said sleeve, means fastening the frame supporting the mechanism, to the inner end of said shaft and a power take off means on the outer end of said shaft, together with a relatively fixed supporting frame for the entire mechanism.

4. A power transmission mechanism including a source of power, a rotatable shaft, a sprocket on said shaft, a second shaft removed from the first shaft, a common supporting means for both shafts, a sprocket on the second shaft, a chain connecting the two sprockets, a worm wheel on the second shaft, a worm gear driven by the worm wheel, a shaft upon which the worm gear is mounted and which is driven thereby, a bevel gear surmounting said shaft, a smaller bevel gear in mesh with said first named bevel gear, said smaller bevel gear being fixedly positioned with relation to the aforesaid mechanism, said fixed mounting including a sleeve, a shaft passing through said sleeve, means fastening the frame supporting the mechanism, to the inner end of said shaft and a power take off means on the outer end of said shaft, together with a relatively fixed supporting frame for the entire mechanism, the inner supporting frame rotating with respect to the main supporting frame when the mechanism is in operation.

5. A means for converting reciprocating to rotary motion comprising a reciprocating engine, a main frame work for the engine, a crank shaft and fly wheel for the engine positioned inside the main frame, a connecting rod connecting the piston of the engine to the crank shaft, a ball and socket joint in the connecting rod, an inner frame in which the crank shaft and fly wheel are mounted, bearings supporting the inner frame in rotatable position with respect to the main frame and power transmission means in the inner frame.

6. A means for converting reciprocating to rotary motion comprising a reciprocating engine, a main frame work for the engine, a crank shaft and fly wheel for the engine positioned inside the main frame, a connecting rod connecting the piston of the engine to the crank shaft, a ball and socket joint in the connecting rod, an inner frame in which the crank shaft and fly wheel are mounted, bearings supporting the inner frame in rotatable position with respect to the main frame and power transmission means in the inner frame, and means for starting the mechanism, said means comprising a crank attaching element on the end of the crank shaft.

7. A means for converting reciprocating to rotary motion comprising a reciprocating engine, a main frame work for the engine, a crank shaft and fly wheel for the engine positioned inside the main frame, a connecting rod connecting the piston of the engine to the crank shaft, a ball and socket joint in the connecting rod, an inner frame in which the crank shaft and fly wheel are mounted, bearings supporting the inner frame in rotatable position with respect to the main frame, power transmission means in the inner frame, and means for starting the mechanism, said means comprising a crank attaching element on the end of the crank shaft, together with a clutch between the crank shaft assembly and the power transmission assembly.

8. A means for converting reciprocating to rotary motion comprising a reciprocating engine, a main frame work for the engine, a crank shaft and fly wheel for the engine positioned inside the main frame, a connecting rod connecting the piston of the engine to the crank shaft, a ball and socket joint in the connecting rod, an inner frame in which the crank shaft and fly wheel are mounted, bearings supporting the inner frame in rotatable position with respect to the main frame and power transmission means in the inner frame, means for starting the mechanism, said means comprising a crank attaching element on the end of the crank shaft, and a clutch between the crank shaft assembly and the power transmission assembly, said power transmission assembly including a worm and wheel, a pair of bevel gears and a driving shaft passing through one of said bevel gears.

GIUSTO BOGGIO.

REFERENCES CITED

The following references are of record in the file of this patent:

UNITED STATES PATENTS

| Number | Name | Date |
|---|---|---|
| 197,035 | Kauiholtz | Nov. 13, 1877 |